United States Patent

Miyama

[11] Patent Number: 5,826,097
[45] Date of Patent: Oct. 20, 1998

[54] METHOD OF CONTROLLING EXECUTION OF DATA FLOW PROGRAM FOR PERFORMING CORRELATED OPERATION PROCESSING ON DATA IN THE ORDER RECEIVED AND APPARATUS THEREFOR

[75] Inventor: Ryuzi Miyama, Tenri, Japan

[73] Assignee: Sharp Kabushiki Kaisha, Osaka-fu, Japan

[21] Appl. No.: 618,725

[22] Filed: Mar. 20, 1996

Related U.S. Application Data

[63] Continuation of Ser. No. 102,726, Aug. 6, 1993, abandoned.

[30] Foreign Application Priority Data

Aug. 7, 1992 [JP] Japan .................................. 4-211356

[51] Int. Cl.$^6$ ...................................................... G06F 15/82
[52] U.S. Cl. ...................................... 395/800.25; 395/377
[58] Field of Search ..................................... 395/800, 376, 395/377, 736, 750.5, 768, 800.25

[56] References Cited

U.S. PATENT DOCUMENTS 5,117,489  5/1992  Komori et al. ......................... 395/375
5,204,828  4/1993  Kohn ...................................... 364/736
5,327,569  7/1994  Shima et al. ........................... 395/800

OTHER PUBLICATIONS

Wong et al., "Biddle: A Bidirectional Data Driven Lisp Engine", IEEE, 1989, pp. 207–214.

*Primary Examiner*—Alyssa H. Bowler
*Assistant Examiner*—Walter D. Davis, Jr.

[57] ABSTRACT

In an information processor formed of a program storage unit 2, a data pair production unit 3 and an operation unit 4 including an accumulator 41, when the sum of products of data ai and bi of the same generation Σ (ai*bi) is produced, a cumulative products instruction code MULA is read out from program storage unit 2. When a data pair related to the instruction code MULA is detected in production portion 3, a multiplication processing of the data pair and accumulation a processing of the multiplication result values using accumulator 41 according to the instruction code MULA are continuously executed in operation unit 4. Accordingly, the order of executing operation processing according to the instruction code MULA including the above-described multiplication processing and accumulation processing is not limited by the order of generations, and therefore data of different generations can be processed in parallel.

14 Claims, 4 Drawing Sheets

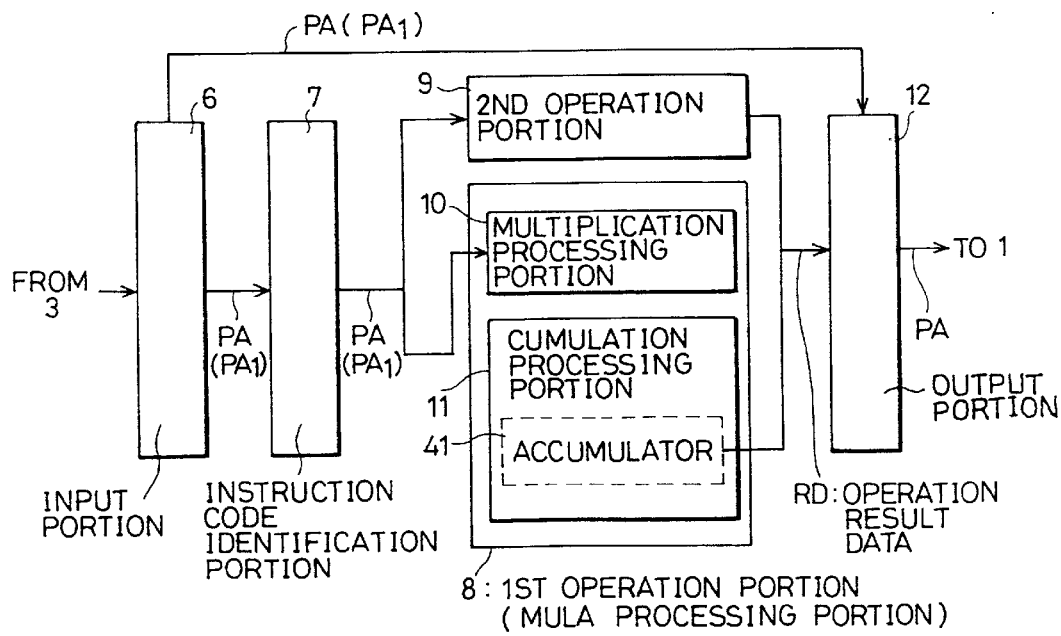
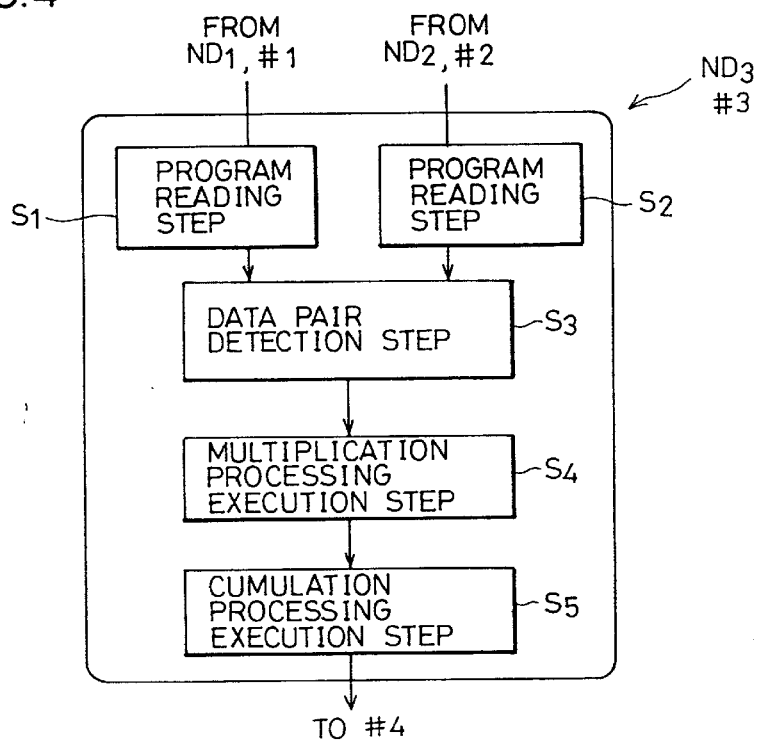

FIG.5   PRIOR ART
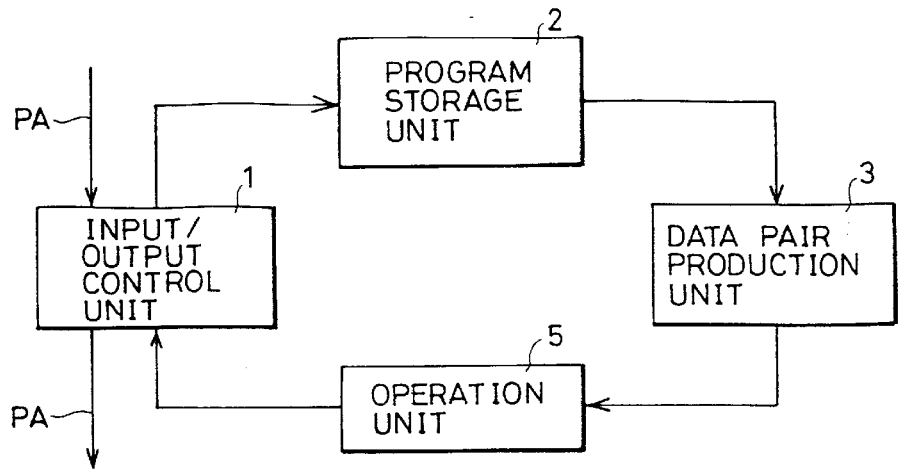
FIG.6A   PRIOR ART
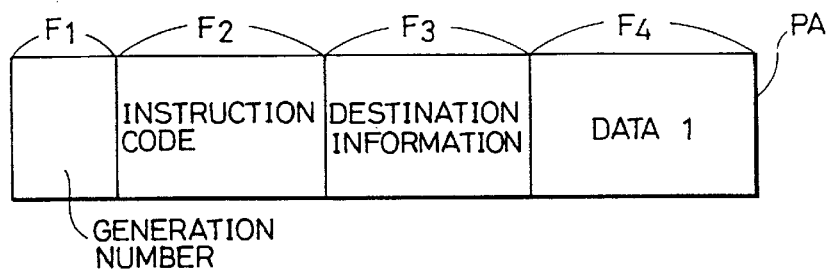
FIG.6B   PRIOR ART
FIG.7   PRIOR ART
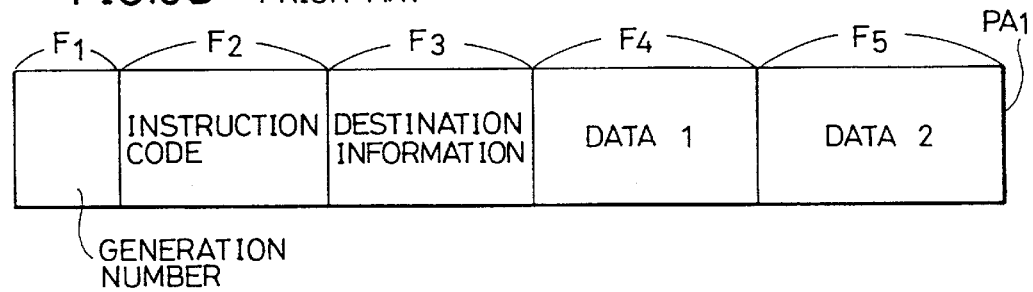

METHOD OF CONTROLLING EXECUTION OF DATA FLOW PROGRAM FOR PERFORMING CORRELATED OPERATION PROCESSING ON DATA IN THE ORDER RECEIVED AND APPARATUS THEREFOR

This application is a continuation of application No. 08/102,726 filed on Aug. 6, 1993, now abandoned.

BACKGROUND OF THE INVENTION

1. Field of the Invention

The present invention relates generally to methods of controlling execution of a data flow program including a processing of calculating the sum of data operation values in a data driven type information processor and apparatuses therefor.

2. Description of the Background Art

A data driven type information processor is capable of sequentially processing data as such data become executable and executing a program regardless of the order of input of data. This permits parallel data processing, thus permitting high speed data processing. When a plurality of groups of data are desired to be processed in such an information processor utilizing the same program, a method of processing utilizing a data packet attached with an identifier for distinguishing the data groups from each other is employed. The identifier is called generation, and a number is sequentially provided to each data group as a generation number. A data packet attached with a generation as described above is distinguished from a data packet having another generation in a data driven type information processor, an operation is executed between data having the same generation, and result data of the same generation is produced. Accordingly, an erroneous operation result having data of a different generation mixed therein will not be output. Conversely, if data of different generations are intentionally operated, as will be described later, some approach of manipulating generation numbers utilizing a delay instruction for example will be necessary.

FIG. 5 is a diagram showing the structure of a conventional data driven type information processor. FIGS. 6A and 6B are diagrams each showing the field structure of a data packet in the information processor shown in FIG. 5. FIG. 7 is a representation showing part of the storage content of a program storage unit shown in FIG. 5. FIG. 8 is a flow chart showing a conventional program for producing the sum of products of data having the same generation number. The processing for producing the sum of products of data having the same generation number shown in FIG. 8 is applied to, for example, a processing of calculating the sales of merchandise. In this sales calculating processing, the same generation number "i" is allocated to sold number data Ai and unit price data Bi for each item. Thus, the total sales of item X having data Ai being A1 and data Bi being B1; item Y having data Ai being A2 and data Bi being B2; and item Z having data Ai being A3 and data Bi being B3 is produced by executing an operation $$\sum_{i=1}^{3}$$

(Ai*Bi) based on the flow chart in FIG. 8 in the information processor shown in FIG. 5. It is noted that application of such a processing of producing the sum of the operation result values of data having the same generation number (product for example) as will be described below, is not particularly limited to the above-described processing of calculating the sales of merchandise. Stated differently, the processing may be applied to any processing in which a plurality of data included in different data groups are input, an operation is executed between data included in the same data group, and operation result values are cumulated.

A data packet PA in FIG. 6A is formed of a generation field F1, an instruction field F2, a destination field F3, and a data field F4, while a data packet PA1 in FIG. 6B includes a data field F5 in addition to the field structure of data packet PA. A generation number is stored in field F1, an instruction code is stored in field F2, destination information is stored in field F3, data 1 is stored in field F4, and data 2 is stored in field F5.

The data driven type information processor shown in FIG. 5 includes an input/output control unit 1, a program storage unit 2, a data pair production unit 3, and an operation unit 5. Input/output control unit 1 temporarily stores a data packet PA input from the outside of the information processor or operation unit 5, reads the generation number and destination information of the data packet, and selectively outputs the data packet based on the read content, externally to the information processor or to program storage unit 2.

A data flow program is stored in program storage unit 2 as illustrated in FIG. 7. Program storage unit 2 reads subsequent destination information and subsequent instruction code as illustrated in FIG. 7 by addressing based on the destination information of the input data packet PA shown in FIG. 6A, and stores the destination information and instruction code into the destination field F3 and instruction field F2 of input data packet PA, respectively, and outputs input data packet PA.

Data pair production unit 3 receives input data packet PA output from program storage unit 2, and queues for a data packet PA to be paired therewith when the instruction code of the input packet indicates a binomial operation instruction which requires two operand data. More specifically, two different data packets having the same generation number and the same destination information are detected, data 1 stored in the field F4 of one data packet among these two data packets is stored into the field F5 of the other data packet as data 2, and the other packet is output. This is called a firing. Meanwhile, if the instruction of the input packet indicates a monomial operation instruction which does not require two operand data, the above-described queuing is not conducted, and the input packet is directly output.

A data packet output with a firing being detected at data pair production unit 3 is data packet PA1 storing two data as illustrated in FIG. 6B.

The operation unit 5 receives data packet PA or PA1 output from the data pair production unit 3, decodes an instruction code stored in the field F2 of the input packet, operates on data 1 or data 2 stored in the field F4 or F5 of the input packet based on the result of decoding, stores the operation result in field F4 and outputs the input data packet.

An operation processing proceeds based on a data flow program stored in program storage unit 2 while a data packet circulates from input/output control unit 1→program storage unit 2→data pair production unit 3→operation unit 5→input/output control unit 1→ . . . .

In the information processor shown in FIG. 5, assume that n different data packet groups having generation numbers from the first to the n-th, respectively are input. The product of two data ai and bi having the i-th (1≦i≦n) generation number is separately produced for data having the first to the n-th generation numbers, and the sum of thus produced n products Σ (ai*bi) is calculated. A program for this calculation is previously stored in program storage unit 2. The program is illustrated in flow chart in FIG. 8.

In the flow chart in FIG. 8, a pentagon or rectangular symbol is called node. Nodes ND11 and ND12 represent input nodes, ND16 an output node, and nodes ND13-ND15 instruction nodes. Node numbers #11–#16 are sequentially attached to the nodes. A node number represents destination information and a symbol allotted to a node represents an instruction code. An instruction code MUL represents a multiplication instruction, an instruction code DLY a delay instruction, and an instruction code ADD an addition instruction. The delay instruction code DLY of node ND14 has an initial value V1. Instruction code DLY increments the generation number of an input a data packet by +1 for output, and outputs two data packets especially when the generation number of the input data packet is the first. In this case, one packet of the output packets is produced by incrementing the generation number of the input packet by +1, while the other output packet is a data packet with the generation number of the input packet with data 1 set to initial value V1 which is "0" in this case.

Now, the operation of the information processor shown in FIG. 5 according to the flow chart in FIG. 8 will be described. Assume that the sum $\Sigma$ (ai*bi) of data having the first and second generation numbers is produced in the flow chart in FIG. 8.

A data packet PA storing 1 for a generation number, #11 for destination information, and "a1" for data 1 is provided to input node ND11. Packet PA is provided to the program storage unit 2 through control unit 1 in FIG. 5. In the program storage unit 2, the subsequent destination information #13 and the subsequent instruction code MUL are read out by addressing based on the destination information shown in FIG. 7, and a data packet PA storing 1 for a generation number, #13 for destination information, MUL for a instruction code and "a1" for data 1 is output to the data pair production unit 3. Data packet PA output to data pair production unit 3 queues for input of data to be paired therewith. Meanwhile, a data packet PA storing 1 for a generation number, #12 for destination information, and "b1" for data 1 is provided to input node ND12. The packet PA is provided to the program storage unit 2 through the input/output control unit 1, therefore the subsequent data is read out in the same manner as described above, and a data packet PA storing 1 for a generation number, #13 for destination information, MUL for an instruction code, and "b1" for data 1 is output to data pair production unit 3. Since a firing is detected between data "b1" and data "a1" which has been queuing, a data packet PA1 storing 1 for a generation number, MUL for an instruction code, #13 for destination information, "a1" for data 1, and "b1" for data 2 is output to the operation unit 5. In the operation unit 5, an operation processing is performed to the input data packet PA1, and a data packet PA storing 1 for a generation number, #13 for destination information, and the value of the result of operation (a1*b1) for data 1 is produced, and this packet is provided to the program storage unit 2 through the input/output control unit 1.

In the program storage unit 2, the subsequent destination information and instruction code are read out by addressing based on the destination information #13 of the input packet PA, and a packet PA storing 1 for a generation number, ADD for an instruction code, #15 for destination information, and the value of (a1*b1) for data 1 is produced, and this packet is output to the data pair production unit 3. Thus, the left input data of node ND15 is obtained.

Assume that "0" is previously stored as a corresponding queuing data for a data packet storing 1 for a generation number and #15 for destination information. Accordingly, a firing is detected between the data "0" and the data (the value a1*b1) of a data packet corresponding to the left input data of node ND15, as a result a data packet PA1 storing 1 for a generation number, ADD for instruction code, #15 for destination information, the value of (a1*b1) for data 1, and "0" for data 2 is obtained and this is provided to the operation unit 5. An operation processing to the input data packet PA1 is conducted in the operation unit 5, and a data packet PA storing 1 for a generation number, #15 for destination information, and the value of (a1*b1) for data 1 is output. Data packet PA from the operation unit 5 is sent to the program storage unit 2 through the input/output control unit 1 as well as output externally to the information processor. The externally output data packet PA is a data packet storing the sum of product having generation numbers up to 1 {$\Sigma$(a1*b1)} at node ND16.

Meanwhile, in program storage unit 2, destination information #14, and instruction code DLY are read out by addressing based on destination information #15 of the input packet PA, and a data packet PA storing 1 for a generation number, DLY for an instruction code, and #14 for destination information, and the value of (a1*b1) for data 1 is obtained, and this data packet is output to data pair production unit 3. The data pair production unit 3 receives the packet PA, identifies its instruction code DLY to be a monomial operation instruction code which does not require two operand data, and therefore directly outputs the input packet PA to operation unit 5 without performing a queuing processing thereto.

In operation unit 5, the packet is received, an operation processing according to the instruction code DLY of the input packet is performed, and a data packet storing 2 for a generation number and the value of (a1*b1) for data 1, and a data packet storing 1 for generation number, and initial value V1 (=0) for data 1 are produced for output. Both output packets are provided to the program storage unit 2 through input/output control unit 1, and a data packet storing 2 for a generation number, #15 for destination information, ADD for an instruction code, and the value of (a1*b1) for data 1, and a data packet storing 1 for generation number, #15 for destination information, ADD for instruction code, and "0" for data 1 are obtained, and both packets are provided to the data pair production unit 3. These two data packets provided to the data pair production unit 3 each queued for input of data to be paired therewith. Right input data (the value of a1*b1) for node ND15 is thus obtained.

Now, input data related to the next generation number 2 is provided to input nodes ND11 and ND12. A data packet PA storing 2 for a generation number, #11 for destination information, and "a2" for data 1 is input to node ND11, and a data packet PA storing 2 for a generation number, #12 for destination information, and "b2" for data 1 is input to node ND12. Processing proceeds to these two data packets PA in the same manner as described above, and left input data at node ND15 is provided. A data packet corresponding to the left input data is a data packet storing 2 for a generation number, #15 for destination information, ADD for an instruction code, and value of (a2*b2) for data 1. Since a firing is detected between the provided left input data related to node ND15 and the right input data (the value a1*b1) which has been already queuing in data pair production unit 3, a data packet storing the sum of products of generation numbers up to 2 for data 1 is obtained at node ND16.

Thus, node ND15 and ND14 form a loop structure, an incremental processing of a generation number according to the instruction code DLY of node ND14 is performed, and therefore an accumulation of the data packets output from node ND13 is performed in node ND15. A data packet storing the result of the accumulation is externally output to the data driven type information processor at node ND16. The value of data 1 stored in the packet which has the last (largest) generation number is the sum of products $\Sigma$ (ai*bi) to be produced.

According to the conventional method of controlling execution of a data flow program for calculating the sum of products $\Sigma$ (ai*bi) of data having generation numbers from 1 to n, a loop structure is employed, which includes the addition instruction code ADD for producing a sum, and the delay instruction code DLY for manipulating a generation number, with the input of code DLY receiving the output of code ADD, and the input of code ADD receiving the output of code DLY. Therefore, in order to execute an addition instruction of a certain generation using the instruction code ADD, an operation processing for the instruction code DLY with respect to the previous generation must be completed. Stated differently, in order to execute an addition instruction of a certain generation using the addition instruction code ADD, processing related to instruction codes ADD of previous generation data must be completed. According to the conventional method of controlling program execution, data must be operated on in the sequence of the order of generation numbers such as generation numbers 1→2→3→ . . . →n. Therefore, when data is externally applied to the apparatus shown in FIG. 5, a function of previously arranging input data in the order of generation numbers will be necessary, which pushes up cost, and the parallel characteristic of data processing unique to such a data driven type information processor is lost, thus greatly degrading operation speed and operation efficiency.

SUMMARY OF THE INVENTION

It is one object of the invention to provide a method of controlling execution of a data flow program permitting improvement of execution efficiency, when a data flow program including a receiving a plurality of data groups having different generation information, a processing for performing an operation between received data having the same generation information and a producing the sum of the results of operations is executed.

Another object of the invention is to provide an apparatus for controlling execution of a data flow program permitting improvement of execution efficiency, when a data flow program including a receiving a plurality of data groups having different generation information, a processing for performing an operation between received data having the same generation information and producing the sum of the results of operations is executed.

In order to achieve the above-described objects, in an information processor including an receiving unit for receiving data and a processing unit for processing the received data from the receiving unit, a method of controlling execution of a data flow program for receiving a plurality of data groups having different generation information, operating data having the same generation information, and adding up the operation result data in a cumulative manner includes the steps of: receiving a plurality of data packets storing different generation information at a time at the receiving unit, performing an operation processing based on the content of the data packets received by the receiving step, and adding up the operation result data in a cumulative manner in the processing unit.

Accordingly, a step of manipulating generation information and a loop structure formed of the manipulating step and a step for the above-described operation processing included in the conventional method of controlling execution of data flow program as described above can be eliminated. Thus, the number of instructions necessary at the time of execution of the data flow program can be reduced, and the order of inputting data to the information processor is no longer limited to the order of generation information. The function of previously arranging input data in the order of generation will not be necessary, thus reducing the cost, and a plurality of different data groups can be operated in parallel at a high speed and the execution efficiency of the above-described data flow program is improved.

In order to achieve the above-described objects, an apparatus for controlling execution of a data flow program according to the invention includes, in an information processor formed of an receiving unit for receiving data and a processing unit for processing the data received from the receiving unit, receiving portion for receiving a plurality of data packets storing different generation information at a time and a processing portion for performing an operation processing based on the content of the data packet received by the receiving portion and adding up the operation result data in a cumulative manner, for receiving the plurality of data having different generation information, performing an operation processing between data having the same generation information, and performing a processing of adding up the operation result data in a cumulative manner.

Accordingly, the function of manipulating generation information and the loop structure formed of the manipulating function and a function for the above-described operation processing included in the above-described data flow program can be eliminated. Thus, the number of instructions to be executed at the time of execution of the data flow program can be reduced, and the order of input of data to the information processor is no longer limited to the order of generation information. Accordingly, the function of previously arranging input data in the order of generation will not be necessary, thus reducing the cost, and a plurality of different data groups can be processed in parallel at a high speed and the execution efficiency of the program is increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing the structure of an operation unit according to one embodiment of the invention;

FIG. 4 is a diagram showing a processing step related to a cumulative products instruction according to one embodiment of the invention;

FIG. 5 is a block diagram showing the structure of a conventional data driven type information processor;

FIGS. 6A and 6B are representations each showing the field structure of a data packet in the information processor shown in FIG. 5;

FIG. 7 is a representation partially showing the storage content of the program storage unit shown in FIG. 5.

DESCRIPTION OF THE PREFERRED EMBODIMENTS

Now, one embodiment of the invention will be described in detail in conjunction with the drawings.

Figure 1:
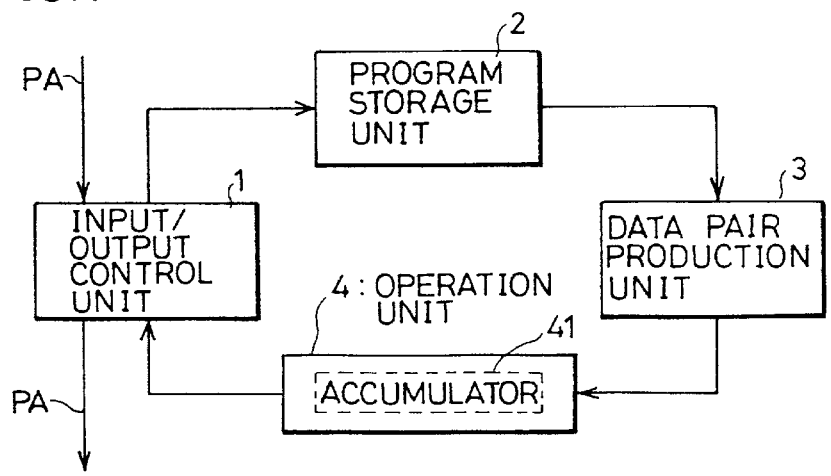
FIG. 1 is a block diagram showing the structure of a data drive type information processor according to one embodiment of the invention.
Figure 3:
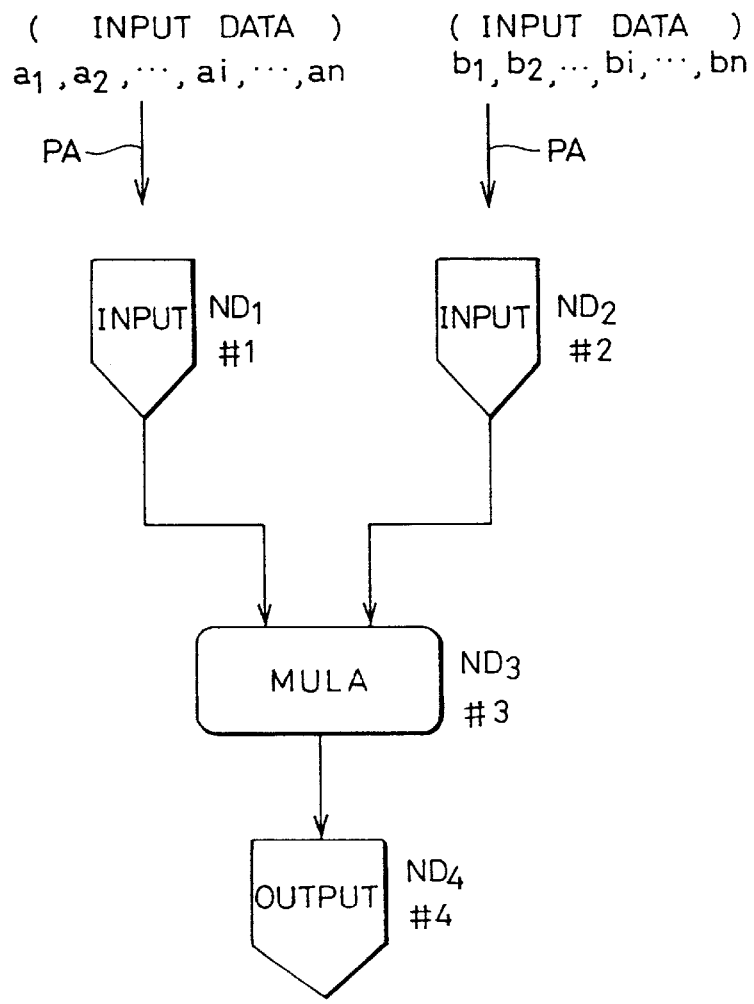
FIG. 3 is a flow chart showing a program for producing the sum of products of data having the same generation number processed in FIG. 1.

FIG. 1 is a block diagram showing the structure of a data driven type information processor according to one embodiment of the invention, FIG. 2 is a block diagram showing the structure of an operation unit according to one embodiment of the invention, and FIG. 3 is a flow chart showing a program for producing the sum of products of data having the same generation number processed in the processor.

The block structure of the data driven type information processor in FIG. 1 is substantially identical to the block structure of the conventional processor shown in FIG. 5 with the essential difference being that the structure of FIG. 1 is provided with an operation unit 4 including an accumulator 41 in place of operation unit 5 shown in FIG. 5. The other structure of FIG. 1 is the same as the conventional structure, and therefore detailed description thereof is omitted here.

Now, the structure and operation of the operation unit 4 will be described. Referring to FIG. 2, the operation unit 4 includes an input portion 6 having its input end connected to an output end of a data pair production unit 3, an instruction code identification portion 7, a first operation portion (MULA processing portion) 8, a second operation portion 9, and an output portion 12 having its output connected to an input end of an input/output control unit 1. The first operation portion 8 further includes a multiplication processing portion 10 and an accumulation processing portion 11 having an accumulator 41.

The input portion 6 receives a data packet PA or PA1 output from data pair production unit 3, and outputs the input packet to the instruction code identification portion 7 and the output portion 12. The instruction code identification portion 7 receives data packet PA or PA1 output from input portion 6, and outputs the input packet to the first operation portion 8 (in this case, the input packet has the format of data packet PA1) upon determining the instruction code of the input packet being a cumulative products instruction MULA, and to the second operation portion 9 upon determining the instruction code being another general instruction other than the instruction MULA, such as an addition instruction or a subtraction instruction. The second operation portion 9 receives the data packet PA or PA1 output from the instruction code identification portion 7, performs an operation processing to the data 1 or data 2 of the input packet according to the instruction code of the input packet, and provides the operation result data RD to the output portion 12. In the first operation portion 8, the data packet PA1 output from the instruction code identification portion 7 is provided to the multiplication processing portion 10. The multiplication processing portion 10 performs a multiplication processing to data 1 and data 2 of the input packet according to the instruction code MULA of the input packet, and provides the result data to accumulation processing portion 11. Accumulation processing portion 11 receives the multiplication result data applied from multiplication processing portion 10, subjects the result data to an addition processing to a value held in accumulator 41 to store the addition result data in accumulator 41, as well as provides the result data as an operation result data RD to the output portion 12. Accordingly, the accumulation value of the multiplication result data input until then, i.e. MULA processing result data will be stored in the accumulator 41. Output portion 12 receives inputs and stores the provided operation result data RD in the data field F4 of data packet PA or PA1, and outputs the data packet (having the format of data packet PA in this case) to input/output control unit 1.

It is noted that although a data packet circulates between the respective portions in FIG. 2, only minimum necessary data may be circulated between the respective portions in order to reduce the width of the data line in the operation unit 4. More specifically, the generation number and destination information of an input packet to the operation unit 4 are allowed to proceed to the output portion 12 from the input portion 6, while only the instruction code, data 1 and data 2 of the input packet to operation processing unit 4 are allowed to proceed from the input portion 6 to the instruction code identification portion 7, from the instruction code identification portion 7 to the first operation portion 8, and from the instruction code identification portion 7 to the second operation portion 9, so that output portion 12 outputs a data packet PA storing the provided information in corresponding respective fields.

Figure 8:
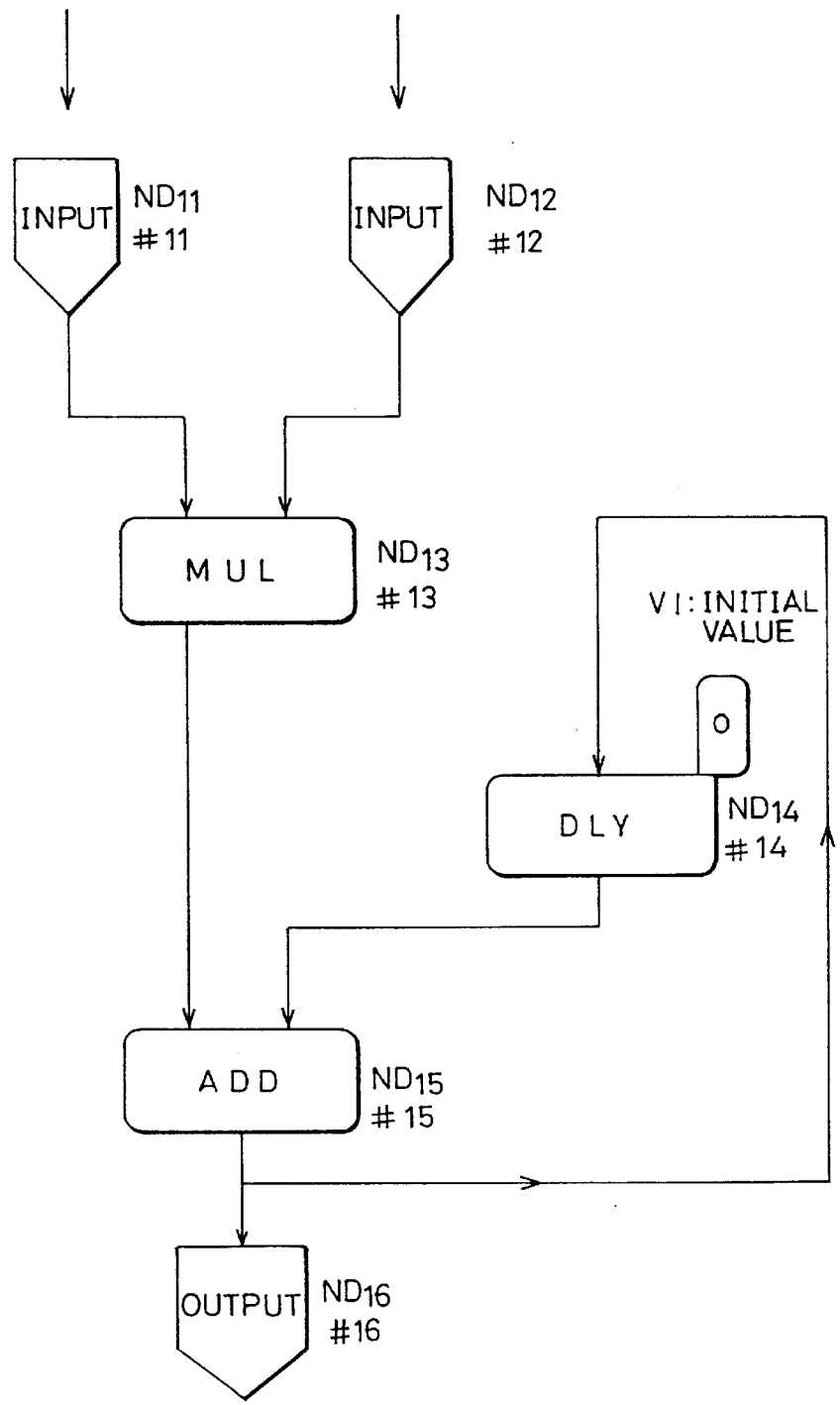
FIG. 8 is a flow chart showing a conventional program for producing the sum of products of data having the same generation number.

The flow chart in FIG. 3 further uses a cumulative products instruction (MULA) in place of the loop structure and the delay instruction (DLY) manipulating generation numbers used in the flow chart shown in FIG. 8 in the conventional example. The cumulative products instruction is an instruction executed in the first operation portion 8 of operation unit 4, to multiply data having the same generation number and to accumulate the multiplication result data in accumulator 41.

The flow chart in FIG. 3 includes input nodes ND1 and ND2, an output node ND4, and an instruction node ND3. Nodes ND1-ND4 are attached with node numbers #1-#4, respectively. A node number represents destination information. Node ND3 is allotted cumulative products instruction code MULA.

Now, a plurality of processings executed in node ND3 (node number #3) and the flow of these processings will be described.

In FIG. 4, a processing related to the instruction code MULA of node ND3 includes program reading steps S1 and S2 in the program storage unit 2, a data pair detection step S3 in the data pair production unit 3, a multiplication processing execution step S4 in the operation unit 4, and accumulation processing execution step S5, where step S4 is executed in the multiplication processing portion 10, and step S5 is executed in the accumulation processing portion 11.

Two data packets related to instruction code MULA are provided from nodes ND1 and ND2 to node ND3. The subsequent program data is read out from the program storage unit 2 in step S1 by the data packet provided from node ND1, while the subsequent program data is read out from the program storage unit 2 in step S2 by the data packet provided from node ND2. After the subsequent program data is read out in program storage unit 2, a firing related to node ND3 is detected by the data pair production unit 3 in the following data pair detection step S3. Then, in the next step S4, a multiplication processing is performed to the data to be paired obtained by the detection in step S3, executed by multiplication processing portion 10, then, in the next step S5, the result of the multiplication processing is added to a value in accumulator 41 by cumulation processing portion 11, and the result of the cumulation is stored in accumulator 41 and output to output portion 12 as well.

Now, a description will be provided on a processing of producing the product of two data a1 and b1 of the first generation, producing the products of the other data ai and bi of the same generation, thereby calculating the sum of these results Σ (ai*bi) in conjunction with the flow chart in FIG. 3.

In this embodiment, data packets circulating in the information processor in FIG. 1 also have the same field structure as data packets PA and PA1 shown in FIGS. 6A and Assume that a processing of preparing data a1–a3 and data b1–b3 of the first-third generations, thereby producing the sum of products thereof (a1*b1+a2*b2+a3*b3) is executed. It is noted that the storage content of accumulator 41 is assumed to be previously initialized and stored with 0.

Now, a data packet PA storing 1 for a generation number, #1 for destination information, and "a1" for data 1 is provided to input node ND1, while a packet data PA storing 1 for a generation number, #2 for destination information, and "b1" for data 1 is provided to input node ND2. The data packets PA provided to input nodes ND1 and ND2, respectively are output to the program storage unit 2 through input/output control unit 1, and the subsequent information is read out by addressing based on the destination information shown in FIG. 7 by each packet. Accordingly, a data packet PA storing 1 for a generation number, MULA for an instruction code, #3 for destination information, and "a1" for data 1 and a data packet PA storing 1 for a generation number, MULA for an instruction code, #3 for destination information, and "b1" for data 1 are output to the data pair production unit 3 from the program storage unit 2. The data pair production unit 3, upon inputting these two data packets output from the program storage unit 2, detects a firing in response to the generation numbers and destination information matching, and outputs a packet PA1 storing 1 for the generation number, MULA for the instruction code, #3 for destination information, "a1" for data 1, and "b1" for data 2 to the operation unit 4. Operation unit 4 receives packet PA1 output from production unit 3, and executes a cumulative products instruction based on the instruction code MULA. Thus, the content of the accumulator 41 (value "0") is added to the value of (a1*b1), and the accumulator 41 attains a state in which the value of (a1*b1) is stored. The cumulative data in accumulator 41 is provided to output node ND4, and output externally to the information processor through input/output control unit 1.

Then, a data packet PA storing 2 for the generation number, #1 for destination information, and "a2" for data 1 is provided to input node ND1, while a packet PA storing 3 for a generation number, #2 for destination information, and "b3" for data 1 is provided to input node ND2. Both packets are provided sequentially the to program storage unit 2 through the input/output control unit 1, and the subsequent information is read out by addressing based on the destination information therein. Accordingly, a data packet PA storing 2 for a generation number, MULA for an instruction code, #3 for destination information, and "a2" for data a 1 and a packet PA storing 3 for a generation number, MULA for an instruction code, #3 for destination information, and "b3" for data 1 are output to the data pair production unit 3 from the program storage unit 2. The data pair production unit 3 receives these two packets PA output from the program storage unit 2. At that time, since the generations of these packets do not match, and therefore a firing is not detected, the packets queue for input of data to be paired therewith in the data pair production unit 3.

A packet PA storing 3 for a generation number, #1 for destination information, and "a3" for data 1 is provided to input node ND1, while a data packet PA storing 2 for generation number, #2 for destination information, and "b1" for data 1 is provided to input node ND2. Both packets are provided sequentially to program storage unit 2 through input/output control unit 1, and the subsequent information is read out by addressing based on the destination information therein. Accordingly, a packet PA storing 3 for a generation number, MULA for an instruction code, #3 for destination information, and "a3" for data 1, and a data packet PA storing 2 for generation number, MULA for an instruction code, #3 for destination information, and "b2" for data 1 are output to the data pair production unit 3 from the program storage unit 2. The data pair production unit 3 receives these two packets PA output from the program storage unit 2, and detects a firing between each of these input packets and each packet which has been already queued, so that a packet PA1 storing 3 for a generation number, MULA for an instruction code, #3 for destination information, "a3" for data 1, and "b3" for data 2, and a packet PA1 storing 2 for a generation number, MULA for an instruction code, #3 for destination information, "a2" for data 1, and "b2" for data 2 are provided and sequentially output to the operation unit 4.

The operation unit 4 receives packets PA1 sequentially output from the data pair production unit 3, and sequentially executes a an instruction based on the instruction code MULA to each of the input packets. At the time, the content of the accumulator 41 is the value of (a1*b1), the value of (a3*b3) is added to the value, and accumulator 41 attains a state in which the value of (a1*b1+a3*b3) is stored. Then, since the value of (a2*b2) is added thereto, the content of the accumulator 41 attains a state in which the value of (a1*b1+ a3*b3+a2*b2) is stored. Since the cumulative data in the accumulator 41 is sequentially provided to output node ND4, the data (a1*b1), (a1*b1+a3*b3), (a1*b1*+a3*b3+ a2*b2) are sequentially output externally to the information processor through input/output control unit 1.

Consequently, the data of packet PA obtained from output node ND4 in response to completion of input of data from input nodes ND1 and ND2 becomes the sum of products of data ai and data bi having the same generation number in different data groups Σ (ai*bi).

As described above, use of cumulative products instruction code MULA permits a cumulation processing of products using accumulator 41 regardless of the order of generation numbers. Accordingly, the order of executing operation processings is not restricted by the order of the generation numbers of packets, and therefore it will not be necessary to previously arrange input data packets in the order of generations, and data of different generations can be processed in parallel.

Note that in this embodiment the sum of products of data of the same generation is produced, but an operation processing between data having the same generation number is not limited to such a multiplication processing, and other operation processings such as a subtraction processing or a division processing between both data may be performed.

As in the foregoing, according to the embodiment, a function equivalent to both functions of the delay instruction code DLY manipulating generation numbers, and the loop structure formed of delay instruction code DLY and instruction code ADD is achieved using only the single instruction code MULA, the number of instructions to be executed is reduced, thus improving the execution speed of a data flow program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an information processor including a receiving portion for receiving data and a processing portion for processing the data received from said receiving portion, wherein said processing portion includes program storage means for (1) storing a data flow program formed of a plurality of destination information and a plurality of instruction information, receiving a data packet formed of a generation field storing generation information for each data group when a plurality of different data groups are processed sequentially using said data flow program, a destination field, an instruction field, a first data field and a second data field, (2) reading out subsequent destination information and subsequent instruction information from said data flow program by addressing based on the content of the received packet, (3) storing said subsequent destination information in the destination field and said subsequent instruction information in the instruction field of said data packet and (4) outputting said data packet;

data pair production means for (1) sequentially receiving data packets output from said program storage means, (2) based on said instruction information of a received data packet, (2-1) detecting two data packets having same generation information and same destination information, (2-1-1) storing the data of the first data field of one data packet of the two data packets into the second data field of the other data packet, and (2-1-2) outputting the other data packet, or (2-2) outputting said received data packet as it is; and operation processing means for (1) receiving said data packet output from said data pair production means, (2) decoding the instruction information of the instruction field of the received data packet, (3) operating on data in said first or second data field of the received data packet based on the result of decoding, (4) storing the result of the operation in the first data field of the received data packet, and (5) outputting the received data packet, a method of controlling execution of the data flow program comprising the steps of:

receiving a plurality of data packets having said generation information different from each other sequentially in said receiving portion; and performing an operation processing based on the content of the data packet received from said receiving step in an order received, and adding up the operation result data in a cumulative manner in said processing portion, including adding the operation result data even when operation result data associated with all data packets required for said operation processing have not been received.

2. A method of controlling execution of a data flow program as recited in claim 1, wherein said performing step further includes in said operation processing means, an operation step of performing an operation processing to the data of the first and second data fields of the received packet based on the instruction information of the received said data packet; and an accumulation step of adding up said operation processing results in a cumulative manner.

3. A method of controlling execution of a data flow program as recited in claim 2, wherein said performing step further includes in said data pair production means, a paired data output step of detecting two data packets having same generation information and same destination information among said received data packets, storing the data of the first data field of one data packet into the second data field of the other data packet, and outputting the other data packet.

4. A method of controlling execution of a data flow program as recited in claim 3, wherein said performing step further includes in said program storage means, a program reading step of storing in the destination field and instruction field of the received packet said subsequent destination information and instruction information read out from said data flow program based on the content of the data packet received by said receiving step, and outputting the received packet.

5. A method as recited in claim 1, wherein said operation processing is correlated.

6. An apparatus for controlling execution of a data flow program used in an information processor including a receiving portion for receiving data and a processing portion for processing the data received from said receiving portion, wherein said processing portion includes:

program storage means for (1) storing a data flow program formed of a plurality of destination information and a plurality of instruction information, receiving a data packet formed of a generation field storing generation information for each data group when a plurality of different data groups are processed sequentially using said data flow program, a destination field, an instruction field, a first data field and a second data field, (2) reading out subsequent destination information and subsequent instruction information from said data flow program by addressing based on the content of the received data packet, (3) storing said subsequent destination information in the destination field and said subsequent instruction information in the instruction field of said data packet and (4) outputting said data packet;

data pair production means for (1) sequentially receiving data packets output from said program storage means, (2) based on said instruction information of a received data packet, (2-1) detecting two data packets having same generation information and same destination information, (2-1-1) storing the data of the first data field of one data packet of the two data packets into the second data field of the other data packet, and (2-1-2) outputting the other data packet, or (2-2) outputting the received data packet as it is; and operation processing means for (1) receiving said data packet output from said data pair production means, (2) decoding the instruction information of the instruction field of the received data packet, (3) operating on the data in said first or second data field of the received packet based on the result of the decoding, (4) storing the result of the operation into the first data field of the received data packet, and (5) outputting the received data packet, said apparatus for controlling execution of the data flow program, comprising receiving means for receiving a plurality of data packets storing said generation information different from each other sequentially; and processing means for performing an operation processing, in an order received, based on the content of the data packet received from said receiving means and adding up the operation result data in a cumulative manner, said processing means adding up the operation result data even when operation result data associated with all data packets required for said operation processing have not been received by said processing means.

7. An apparatus for controlling execution of a data flow program as recited in claim 6, wherein said processing means includes said operation processing means, and said operation processing means further includes identification means for identifying the instruction information of said received data packet; and operation means for operating on the data of the first or second data field of said received packet based on the instruction information of the received packet.

8. An apparatus for controlling execution of a data flow program as recited in claim 7, wherein said operation means further includes second operation means for operating on the data of the first or second data field of the received packet based on the instruction information of the received packet, in response to said identification means identifying the instruction information of the received packet not to be prescribed instruction information.

9. An apparatus for controlling execution of a data flow program as recited in claim 7, wherein said operation means further includes first operation means for operating on the data of the first and second data fields of said received packet based on the instruction information of the received packet, in response to said identification means identifying the instruction information of the received packet to be prescribed instruction information, and adding up the operation result data in a cumulative manner.

10. An apparatus for controlling execution of a data flow program as recited in claim 9, wherein said operation means further includes second operation means for operating on the data of the first or second data field of said received packet based on the instruction information of the received packet, in response to said identification means identifying the instruction information of the received packet not to be said prescribed instruction information.

11. An apparatus for controlling execution of a data flow program as recited in claim 6, wherein only a portion of said operation means for outputting the received packet receives generation information and destination information from a portion of said operation means for receiving said data packet.

12. An apparatus as recited in claim 6, wherein said operation processing performed by said processing means is correlated.

13. An apparatus for controlling execution of a data flow program including an accumulation operation in a data driven information processor comprising:

an input section receiving a plurality of data packets having generation information different from each sequentially;

an instruction code identifying section identifying an instruction code associated with a data packet received by said input section;

an operation section performing, based on the content of the data packet received from said receiving in an order received, an operation on said data packet in accordance with said instruction code and outputting resultant data; and an accumulation processing section including an accumulator storing a value, said accumulation processing section receiving said resultant data when said instruction code indicates accumulation processing, said accumulation processing section adding said resultant data to said value even when resultant data associated with all data packets required for said operation have not been received by said operation section.

14. A method for controlling execution of a data flow program including an accumulation operation in a data driven information processor comprising:

receiving a plurality of data packets having generation information different from each other sequentially;

identifying an instruction code associated with a data packet received by said input section;

performing an operation based on the content of the data packet received from said receiving in an order received, on said data packet in accordance with said instruction code and outputting resultant data;

storing a value; and adding, when said instruction code indicates accumulation processing, said resultant data to said value even when resultant data associated with all data packets required for said operation have not been received.

* * * * *